UNITED STATES PATENT OFFICE 2,508,477

ENRICHED FOODSTUFFS

Leonard Stievater, Jr., Scotch Plains, N. J., and Paul Stecher, New York, N. Y., assignors to Merck & Co., Inc., Rahway, N. J., a corporation of New Jersey No Drawing. Application October 16, 1946, Serial No. 703,464

4 Claims. (Cl. 99—11)

This invention relates to novel and improved granular foodstuffs which have been enriched by the addition of vitamins and minerals, and to certain improved processes by which they may be prepared. The improved foodstuffs, enriched by the addition of vitamins and minerals, with which this invention is particularly concerned, are characterized by enhanced stability during storage and by superior and improved resistance to deterioration by the development of rancidity therein. Moreover, they are far more resistant to the attacks of insects, and are much less likely to become infested by insects, than are similar granular foodstuffs which have not been enriched.

This application is a continuation-in-part of our copending application Serial No. 631,218, filed November 27, 1945.

It is one of the objects of this invention to prepare certain enriched foodstuffs which are normally nutritionally deficient, such as degerminated corn grits and degerminated corn meal, by the addition thereto of riboflavin, thiamin (vitamin $B_1$), niacin and iron, the addition being carried out in such manner that only a slight amount of the enrichment agent will be lost during washing of the foodstuff preparatory to cooking. It is another object to prepare enriched foodstuffs of the character specified which will have less tendency to develop rancidity, and less tendency to become infested by insects, than presently available foodstuff materials. These objects, as well as other aims and objects of this invention, will be apparent from the ensuing disclosure of certain preferred embodiments thereof.

In preparing foodstuffs enriched by the addition of water-soluble vitamins a serious problem has been presented in that a large proportion of the added enriching agent has been washed out and lost when the enriched food is rinsed in water prior to cooking. Moreover, when metallic salts or metals have been present in the additive enriching agent, there has been an increased tendency toward rancidity due to acceleration of the reaction between natural oils present in the foodstuff and air or oxygen. As it is the primary aim of this invention to enhance the nutritive value of granular foodstuffs of the character specified by the addition of vitamins such as riboflavin, the water-soluble vitamins thiamin and niacin, and by the addition of iron salts which normally catalyze those oxidation reactions tending to cause rancidity, it will be understood that securing a commercially satisfactory enriched food product has been very difficult.

It has now been discovered that certain protein materials such as zein, either used alone, or together with resinous compounds related to phenanthrene such as abietic acid, or rosin, may be employed to coat the enriched granular food product, this coating material serving to bind the additive enrichment agent to the food. The binding material, such as, for example, zein alone, or zein and some resinous phenanthrene derivative such as abietic acid or a modified rosin, may be dissolved in a suitable solvent such as water-acetone, or a water-alcohol mixture. This solution may then be sprayed on the food particles enriched by the additive vitamins and minerals, thus forming thereon a hard, relatively water-insoluble film or envelope which physically holds the nutrients to the surfaces of the food particles and prevents leaching out of these water-soluble nutrients when the foodstuff is rinsed in water. However, when the enriched foodstuff is eaten and taken into the stomach, the protective coating or binding material is readily digested, thus releasing the added nutrient materials along with the food particles.

In practicing our invention we may coat any granular foodstuff, such as grits, corn meal, farina, or rice, with the added nutrient vitamins and minerals, and then, if desired, apply a solution of the protective binding agent to the surfaces of the enriched granular material to form thereon a hard protective coating serving to prevent loss of the nutrients by the action of water during the washing operation.

The adjuvant nutrients and the food may first be blended together either by mechanically mixing the two in a dry state, or spraying the foodstuff with a solution of the added nutrient materials dissolved in a suitable solvent. The discrete particles of the granular foodstuff may thus be coated with vitamins such as riboflavin, water-soluble vitamins such as thiamin and niacin, and with the mineral salt, such as a soluble iron salt, in one or more separate coatings. Or, if desired, the adjuvant nutrients may be applied in separate layers to the granular foodstuff, each layer being bound to the food particles and provided with a protective coating of the protein material before the next layer or coating of water-soluble vitamins and mineral salts is applied to the foodstuff. In carrying out this alternate procedure, one method which may be utilized is to add the adjuvant nutrients in a dry state to the protective coating on the particles of granular foodstuff while the coating is still tacky during the drying stage. If desired, the most soluble adjuvant nutrients may first be applied to the foodstuff, and the less soluble adjuvant nutrients added subsequently during the enrichment process, the most soluble vitamins and minerals being thus protected by a plurality of coats of the subsequently applied protective coating.

Alternatively, the adjuvant nutrients may be applied to the foodstuff by spraying the foodstuff with a solution or suspension of the added nutrient materials in a solution of the protective coating. In accordance with this procedure the adjuvant nutrients are added to a solution of the protein material dissolved in a suitable solvent such as water-acetone or a water-alcohol mixture. The resulting mixture is then sprayed on the food particles thus forming thereon a hard, relatively water-insoluble film. Since the adjuvant nutrients are applied together with the protective coating, leaching out of the water-soluble nutrients when the foodstuff is rinsed in water is prevented.

In the event that an added nutrient material which has a tendency to react with the foodstuff, or with other added nutrient materials, is to be applied, it is possible to seal off this adjuvant nutrient from the particle, and from other added nutrients with which it may react, by enclosing it within layers of the protective coating. Thus, it has been found desirable in some instances to protect the foodstuff by first applying a coating of an oxidation inhibitor to which a non-reactive vitamin such as riboflavin may be added. The nutrient materials such as thiamin, niacin and iron salts which may have a tendency to react with the foodstuff can then be applied simultaneously with the protein binder. In order to prevent any loss of the nutrients during washing, a protective coating of the oxidation inhibitor can be applied.

We have found that when zein is used alone in preparing the protective coating very satisfactory results are secured. However, where a tougher and more resistant coating is desirable, or where there is a tendency for added metallic salts to catalyze undesirable reactions on the surface of the food particle, it may be desirable to include in the coating composition a non-toxic oxidation inhibitor such as abietic acid, nordihydroguaiaretic acid, ascorbyl palmitate, or a mixture of ascorbyl palmitate with α-tocopherol or lecithin. These oxidation inhibitors may be dissolved in a suitable solvent such as acetone, a lower aliphatic alcohol, or ethyl ether, and applied to the surfaces of the food particles in the form of a spray. Those adjuvant nutrients which tend to accelerate rancidity are preferably added to the foodstuff last, and they may be mixed with the food particles in any suitable manner after the latter have been coated with the inhibitor and, preferably, with one or more coatings of protective protein. It is of course desirable to add the active adjuvant nutrient last when that nutrient will react with some constituent in the food particles; as, in this way, the intervening layers of more inert adjuvant nutrients and protective protein coating form separating envelopes which prevent the occurrence of the undesirable reactions.

By following the procedure above described we are able to produce a highly concentrated food product which may be utilized alone, or which may be mixed with unenriched food products to bring the nutrient content of the entire mixture up to a predetermined standard.

The following are illustrative examples of the enrichment of food products in accordance with our invention.

Example 1

A conventional tablet coating pan was charged with 85 pounds of corn grits and 101 grams of thiamin chloride hydrochloride. During this and all subsequent operations the pan was continuously rotated to effect thorough mixing of its contents, and it was heated to about 35° C., as was found to be advantageous.

When the grits and thiamin had been thoroughly blended and warmed, the mixture was successively sprayed with a solution of 115 grams of abietic acid in 3 liters of acetone, and with a solution of 850 grams of zein in 3350 cubic centimeters of acetone and 1544 cubic centimeters of water. While the zein coating was still moist and tacky, 1274 grams of niacin and 3432 grams of iron orthophosphate were sifted on the mixture. These nutrient additives adhered to the outer zein layer, and were securely affixed to the foodstuff by one or more additional coatings of zein. When the last coating of zein had been applied the grits were dried.

Slightly higher temperatures could be employed to dry the enriched grits, since the corn oil was confined within the grits by the various coatings on the grit particles. Air drying at a temperature in the order of 40°–50° C. for a period of approximately 8 hours has been found to be satisfactory to thoroughly dry the grits and these temperatures were employed. The dried food product was then put through a No. 16 screen and packaged.

Two ounces of the concentrated foodstuff prepared as described when mixed with 100 pounds of unenriched corn grits will raise the content of added nutrients of the whole foodstuff to a sufficient extent to meet the standards imposed by law in various States for enriched foodstuffs.

Example 2

A rotating tablet pan was charged with 51 pounds of corn grits which were then heated and sprayed with a solution of 510 grams of zein in a mixture of 2040 cubic centimeters of acetone and 930 cubic centimeters of water. 61 grams of thiamin chloride hydrochloride were added to the pan while the zein coating was still tacky, the thiamin particles thus adhering to the grit granules. This mixture was then coated successively with a solution of zein, dissolved in a mixture of ethyl alcohol and water, and additionally enriched with niacin and iron orthophosphate as described in Example 1. The resulting food product was very satisfactory as an enriched food material.

Example 3

A rotating tablet pan was charged with 51 pounds of corn grits which were then heated and sprayed with a solution of 510 grams of zein in a mixture of 2040 cubic centimeters of acetone and 930 cubic centimeters of water. 61 grams of thiamin chloride hydrochloride were added to the pan while the zein coating was still tacky, the thiamin particles thus adhering to the grit granules. This mixture was then coated successively with a solution of 5,6,5′,6′-tetrahydroxy-3,3,3′,3′-tetramethyl - bis - 1:1 - spirohydrindene dissolved in ethyl alcohol, and with a solution of zein, dissolved in a mixture of ethyl alcohol and water, and additionally enriched with niacin and iron orthophosphate as described in Example 1.

Example 4

A rotating tablet pan was charged with 10 pounds of corn grits. While its contents were continuously agitated, it was heated to about 35° C., and sprayed with a solution consisting of 80 grams of soluble casein and 10.3 grams of thiamin chloride hydrochloride dissolved in 590 cubic centimeters of water. The grits were then sprayed successively with solutions of ascorbyl palmitate in ethyl ether, and zein dissolved in methyl alcohol, and additionally enriched by the addition of niacin and iron orthophosphate. It was finally coated with several additional coats of the zein solution as described in Example 1.

Example 5

1500 grams of corn grits were placed in a conventional tablet coating pan. The corn grits were continuously agitated while being sprayed with a suspension consisting of 4.66 grams of riboflavin uniformly suspended in a solution of 30 grams of abietic acid in 200 cubic centimeters of acetone. The grits were rotated until dry and then the second coat was applied. This coat consisted of 7.75 grams of thiamin chloride, 62 grams of niacin and 202 grams of iron phosphate suspended in a solution of 75 grams of zein dissolved in 640 cubic centimeters of acetone and 160 centimeters of water. After application of this second coat, the grits were screened through a No. 10 screen and dried in a drying oven at 45° C. for three hours.

The dried grits were then transferred to the coating pan and coated with a solution of 140 grams of abietic acid in 600 cubic centimeters of acetone. The enriched particles were dried in a drying oven at 45° C. for approximately twelve hours. The dried food product was then put through a No. 10 screen and packaged.

Tests in which the enriched food products were washed with water and stirred as prescribed by various State laws disclosed very little loss of the nutrients. After the rinsing, the amount of nutrients retained by the enriched product averaged between 90 and 99%. This was well above the minimum required by the State laws.

Example 6

86 pounds of rice were placed in a pan and, while being continuously agitated, were heated at 35° C. and coated with 60 grams of zein dissolved in a mixture of 700 cubic centimeters of acetone and 435 cubic centimeters of distilled water. While the zein coating was still moist and tacky, 1200 grams of niacin, 120 grams of thiamin chloride hydrochloride, and 500 grams of riboflavin were sifted into the pan. When the first coating was dry, three additional coatings of the zein solution were sprayed on the enriched rice particles and the mixture dried for about 8 hours at approximately 50° C.

Tests in which the enriched food products were washed with warm (77° F.) water and stirred, as prescribed by various State laws, disclosed very little loss of the nutrients. After the rinsing the amount of nutrients contained by each of the products was well above the minimum required by the State laws.

In order to determine just how stable the enriched corn grits containing metallic salts were against the development of rancidity during storage, samples of the food products prepared in accordance with Examples 1, 2 and 3 were stored for 6 months at room temperature. Certain other samples were also stored at temperatures somewhat above room temperature, a temperature of 55° C. being selected. Similar samples containing, however, no oxidation inhibiting agents were stored as control samples. No indication of rancidity was found in any of the products prepared in accordance with Examples 1, 2 or 3, while all the control samples had developed a rancid odor and flavor at the end of 6 months.

The increased resistance to insect infestation of enriched food products prepared in accordance with our invention is illustrated by the following examples.

Example 7

An opened bag of enriched corn grits coated with zein and abietic acid, in accordance with the procedure described above, was placed in a jar together with an opened bag of unenriched corn grits. The jar was infested with 50 adult red flour beetles (*Tribolium castaneum*) and the open mouth of the jar covered with a sheet of air-permeable filter paper. The joint was tightly sealed to prevent escape of the beetles.

At the end of one week there was only one live beetle present in the zein coated grits, while 23 live beetles were in the unenriched grits and 26 live beetles in the jar. A second inspection at the end of three months revealed no live beetles in the coated enriched corn grits, 33 live beetles and 15 live larvae in the unenriched grits, and 33 live beetles in the jar. The resistance to insect infestation of enriched grits covered with zein and abietic acid is apparent.

Example 8

Tests similar to those described in Example 7 were carried out using, however, 49 sawtooth grain beetles (*Oryzaephilus surinamensis*) instead of adult red flour beetles. One week after the beetles were placed in the jar there were no beetles in the coated enriched grits, while 24 live beetles were found in the unenriched grits and 25 live beetles in the jar. At the end of three months there were no beetles found in the coated grits, while 20 live beetles and 3 dead beetles were found in the unenriched grits and 21 live beetles and 5 dead beetles in the jar. The resistance to insect infestation of our enriched corn grits covered with zein and abietic acid is apparent from the foregoing results.

Example 9

The procedure employed was similar to the procedure described in Example 7 but 51 rice weevils (*Sitophilus oryza*) were used in the infestation tests in place of the adult red flour beetles. At the end of one week 4 dead weevils were found in the coated grits, 35 live weevils in the unenriched grits and 12 live weevils in the jar. At the end of 3 months there were 4 dead weevils in the coated grits and 29 live weevils and 1 dead weevil in the unenriched grits, and 12 live weevils and 5 dead weevils in the jar. The resistance of the enriched corn grits prepared in accordance with our procedure to insect infestation is apparent from these tests.

It should be understood that the foregoing description and examples are intended to be illustrative, but not restrictive of our invention. Changes in or variations from the invention as herein described may be made which would fall within the spirit of our invention, and it is our intention that these modifications and variations be considered as part of our invention to the extent that they are included within the scope of the appended claims:

We claim:

1. The process of enriching a granular foodstuff with riboflavin, thiamin, niacin and an iron salt which comprises applying to the granules a fluid mixture of riboflavin, abietic acid and acetone and evaporating the acetone to form a coating on the granules consisting of riboflavin suspended in abietic acid, then applying to the granules a fluid mixture of thiamin, niacin, an iron salt, zein, acetone and water and evaporating the water and acetone to form a second coating on the granules consisting of thiamin, niacin and an iron salt, suspended in zein, and finally applying to the granules a fluid mixture of abietic acid and acetone and evaporating the acetone to form an outer coating of abietic acid on the granules.

2. The process of enriching corn grits with riboflavin, thiamin, niacin and an iron salt which comprises applying to the granules a fluid mixture of riboflavin, abietic acid and acetone and evaporating the acetone to form a coating on the granules consisting of riboflavin suspended in abietic acid, then applying to the granules a fluid mixture of thiamin, niacin, an iron salt, zein, acetone and water and evaporating the water and acetone to form a second coating on the granules consisting of thiamin, niacin, and an iron salt, suspended in zein, and finally applying to the granules a fluid mixture of abietic acid and acetone and evaporating the acetone to form an outer coating of abietic acid on the granules.

3. An enriched granular foodstuff, the discrete particles of said foodstuff having a plurality of coatings enveloping the same, the innermost coating consisting of riboflavin, suspended in abietic acid, an intermediate coating consisting of thiamin, niacin and iron salts suspended in zein, and the outermost coating of said particles consisting of abietic acid.

4. Enriched corn grits, the discrete particles of said corn grits having a plurality of coatings enveloping the same, the innermost coating consisting of riboflavin, suspended in abietic acid, an intermediate coating consisting of thiamin, niacin and iron salts suspended in zein, and the outermost coating of said particles consisting of abietic acid.

LEONARD STIEVATER, Jr.
PAUL STECHER.

REFERENCES CITED

The following references are of record in the file of this patent:

UNITED STATES PATENTS

| Number | Name | Date |
| --- | --- | --- |
| 784,503 | Rucker et al. | Mar. 7, 1905 |
| 1,764,085 | Placak | June 17, 1930 |
| 1,879,762 | Nitardy | Sept. 27, 1932 |
| 2,154,482 | Weber | Apr. 18, 1939 |
| 2,375,279 | Buxton et al. | May 8, 1945 |
| 2,381,343 | Furter | Aug. 7, 1945 |
| 2,390,210 | Fieger et al. | Dec. 4, 1945 |

OTHER REFERENCES

"The Condensed Chemical Dictionary" (Third edition), Reinhold Publishing Corporation, 330 W. Forty-second Street, New York, page 681.